United States Patent
Jiang et al.

(10) Patent No.: US 7,602,791 B1
(45) Date of Patent: *Oct. 13, 2009

(54) CHANNEL EFFICIENCY BASED PACKET SCHEDULING FOR INTERACTIVE DATA IN CELLULAR NETWORKS

(75) Inventors: Zhimei Jiang, Eatontown, NJ (US); Nemmara K. Shankaranarayanan, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 367 days.

This patent is subject to a terminal disclaimer.

(21) Appl. No.: 11/405,839

(22) Filed: Apr. 18, 2006

Related U.S. Application Data

(63) Continuation of application No. 09/783,977, filed on Feb. 16, 2001, now Pat. No. 7,046,678.

(60) Provisional application No. 60/183,710, filed on Feb. 18, 2000.

(51) Int. Cl.
*H04L 12/56* (2006.01)

(52) U.S. Cl. .............. 370/395.41; 370/230; 370/328

(58) Field of Classification Search .......... 370/230, 370/232, 233, 328, 329, 352, 412, 431, 437, 370/468
See application file for complete search history.

(56) References Cited

U.S. PATENT DOCUMENTS

| | | | |
|---|---|---|---|
| 5,726,640 A | | 3/1998 | Jones et al. |
| 5,896,561 A * | | 4/1999 | Schrader et al. .......... 455/67.11 |
| 6,236,656 B1 | | 5/2001 | Westerberg et al. |
| 6,393,012 B1 * | | 5/2002 | Pankaj ...................... 370/342 |
| 6,501,745 B1 * | | 12/2002 | Turina et al. ................ 370/337 |
| 6,519,233 B1 * | | 2/2003 | Gutierrez .................... 370/320 |
| 6,570,883 B1 | | 5/2003 | Wong |
| 6,584,089 B1 * | | 6/2003 | Honkasalo et al. .......... 370/338 |
| 6,987,738 B2 * | | 1/2006 | Subramanian et al. ...... 370/252 |
| 7,072,413 B2 * | | 7/2006 | Walton et al. ............... 375/267 |
| 7,257,083 B2 * | | 8/2007 | Bansal et al. ............... 370/235 |
| 7,349,338 B2 * | | 3/2008 | Balachandran et al. ..... 370/232 |
| 7,366,202 B2 * | | 4/2008 | Scherzer et al. ............ 370/480 |
| 7,474,642 B1 * | | 1/2009 | Chheda ...................... 370/329 |
| 2004/0174842 A1 * | | 9/2004 | Kubler et al. ............... 370/328 |
| 2006/0146863 A1 * | | 7/2006 | Spinar et al. ................ 370/449 |

(Continued)

OTHER PUBLICATIONS

U.S. Publication 2002/0094815, Kanerva, Prioritized Sending of Data.*

(Continued)

*Primary Examiner*—Chi H. Pham
*Assistant Examiner*—Kevin Mew

(57) ABSTRACT

The present packet scheduling algorithm gives cellular network operators greater flexibility in adjusting the way resources are allocated among interactive best-effort data users. The present packet scheduling algorithm is capable of allocating radio resource dynamically, not only based on channel conditions, but also to achieve different performance trade-offs among users with different link qualities. According to the algorithm, channel quality is determined for each user. Channel efficiency is calculated and the channel efficiency value is used as the primary factor in weighting the delivery of packets to (or from) a given user. In a packet schedule weighting equation, a value of exponent may be varied from negative to positive to give good (or bad) users better service. However, performance of users with bad channel qualities degrades the performance of good channel users in a disproportionate manner.

17 Claims, 12 Drawing Sheets

U.S. PATENT DOCUMENTS

| | | | | |
|---|---|---|---|---|
| 2006/0262750 | A1* | 11/2006 | Walton et al. | 370/329 |
| 2007/0201400 | A1* | 8/2007 | Kang et al. | 370/329 |
| 2007/0230335 | A1* | 10/2007 | Sang et al. | 370/230 |
| 2007/0248048 | A1* | 10/2007 | Zhu et al. | 370/329 |
| 2008/0247357 | A1* | 10/2008 | Kim et al. | 370/329 |

OTHER PUBLICATIONS

P. Barford and M. Crovella, "Generating representative Web workloads for network and server performance evaluation," *SIGMETRICS '98/PERFORMANCE'98, Performance Evaluation Review*, Jun. 1998, vol. 26, pp. 151-160.

P. Bhagwat et. Al, "Enchancing throughput over wireless LANs using channel state dependent packet scheduling," *Proceedings of INFOCOM '96*, Mar. 1996, pp. 113-140.

V. Bharghavan et. Al, "Fair queuing in wireless networks: issues and approaches," *IEEE Personal Communications*, Feb. 1999, vol. 6, pp. 44-53.

G. Bianchi et. Al, "On utility fair adaptive services in wireless networks," *1998 Sixth International Workshop on Quality of Service (IWQoS'98)*, Napa, CA, USA, May 18-20, 1998, pp. 256-267.

Justin Chuang and Shailender Timiri, "EDEG Compact and EDGE Classis Data Performance," *2000 Universal Wireless Communications Consortium Global summit*, Apr. 2000.

C. Fragouli et. al, "Controlled multimedia wireless link sharing via enhanced class-based queuing with channel-state-dependent packet scheduling," *Proceedings of INFOCOM '98*, Mar. 1998, pp. 572-580.

A. Furuskar et. al, "EDGE Enhanced Data Rates for GSM and TDMA/136 Evolution," *IEEE Personal Communications*, vol. 6, No. 3, Jun. 1999, pp. 56-66.

Z. Jiang, L. F. Chang, and N. K. Shankeranarayanan, "Providing multiple service classes for bursty data traffic in cellular networks," *ACG SIGCOMM 97 Conference, Computer Communication Review*, Oct. 1997, vol. 27, pp. 63-74.

S. Khaunte, J. Limb, "Statistical characterization of a World Wide Web browsing session," Georgia Institute of Technology, College of Computing Technical Report, GIT-CC-97-17, 1997.

S. Lu et. al, "Fair scheduling in wireless packet networks," *ACM SIGCOMM 97 Conference, Computer Communication Review*, Oct. 1997, vol. 27, pp. 63-74.

T. Nandagopal et. al, "A unifies architecture for the design and evaluation of wireless fair queuing algorithms," *Proceedings of ACM/IEEE MOBICOM'99*, Aug. 1999, pp. 132-142.

T. S. E. Ng et. al, "Packet fair queuing algorithms for wireless networks with location dependent errors," *Proceedings of INFOSOM '98*, Mar. 1998, pp. 1103-1111.

X. Qiu, and J. Chuang, "Link adaptation in wireless data networks for throughput maximization under retransmissions," *ICC '99*.

P. Ramanathan and P. Agrawal, "Adapting packet fair queuing algorithms to wireless networks," *Proceedings on MOBICOM 1998*, Oct. 1998, pp. 1-9.

H. Zhang, "Service disciplines for guaranteed performance service in packet-switching networks," *Proceedings of the IEEE*, Oct. 1995, vol. 83, pp. 1374-1396.

ETSI, SMG2 EDGE 006-99, "EDGE: concept proposal for enhanced GPRS".

ETSI, "Digital cellular telecommunications system (Phase 2+), General Packet Radio Service(GPRS), service description," v6.3.1, 1999.

* cited by examiner

EFFECTIVE SERVING RATES OF MCS-8 USERS

EFFECTIVE SERVING RATES OF MCS-6 USERS

CHANNEL USAGE OF MCS-8 USERS

CHANNEL USAGE OF MCS-6 USERS

EFFECTIVE SERVING RATES OF MCS-8 USERS

EFFECTIVE SERVING RATES OF MCS-6 USERS

EFFECTIVE SERVING RATES OF MCS-8 USERS

EFFECTIVE SERVING RATES OF MCS-6 USERS

EFFECTIVE SERVING RATES OF MCS-8 USERS

EFFECTIVE SERVING RATES OF MCS-6 USERS

EFFECTIVE SERVING RATES OF MCS-4 USERS

CHANNEL EFFICIENCY BASED PACKET SCHEDULING FOR INTERACTIVE DATA IN CELLULAR NETWORKS

RELATED APPLICATIONS

This application is a continuation of U.S. patent application Ser. No. 09/783,977, filed Feb. 16, 2001, now U.S. Pat. No. 7,046,678 which claims priority to U.S. Provisional patent application Ser. No. 60/183,710 filed Feb. 18, 2000, which are incorporated herein by reference in their entirety.

BACKGROUND OF THE INVENTION

1. Technical Field

The invention relates to the field of packet cellular wireless networks and, more particularly, to an algorithm which improves upon the flexibility and efficiency of packet delivery to users of cellular services.

2. Description of the Related Arts

Cellular wireless data networks have inherent sources of inequality and unfairness since the channel conditions are not uniform for all users. Clearly, some mobile cellular wireless users, depending on various factors, experience better service quality at different times during a call, for example, when the user is mobile or due to atmospheric or topographic considerations in the path from mobile station to base station. To support efficient data access in cellular wireless networks where vast amounts of data may be downloaded to a user, for example, of a pocket personal computer, network operators will have to decide on how to optimize the performance of users with different channel qualities and at the same time maintain a certain degree of fairness. Packet scheduling, which assigns radio resources to mobile stations, plays a critical role in this process.

There have been a number of scheduling algorithms proposed for wireless networks. In general, these algorithms defer sending packets for a mobile station during error bursts, and resume transmission only when the link quality improves to an acceptable level. Some of them also supplement the mobile station with additional bandwidth for the time period that it was skipped to achieve certain fairness.

There are two closely related problems that are not addressed in the previous work. First, users may deliver different amounts of data using the same amount of radio resource, for example in systems with link adaptation. Since it can never be predicted exactly whether a packet will be transmitted successfully in cellular systems, the network will typically deliver the packet so long as its error probability is lower than a certain threshold. So some packets may end up having errors and have to be discarded. Moreover, because wireless users may have different channel qualities, the packet error rates can vary significantly from user to user. As a result, users may deliver different amounts of data using the same amount of channel resource. This is particularly important in wide-area cellular environments, where packet errors are much more common and harder to predict. Secondly, the focus of the previous work has been on providing the kind of fairness such that when averaging over some time period, users can receive their data rate guarantees, so long as their channel conditions permit. Although this type of fairness is necessary when stringent delay and rate requirements are specified in a service level agreement with the user, most of the best-effort data applications, such as web browsing and email, are much more flexible in terms of rate and delay. Loosened quality of service (QoS) requirements make it very compelling for network operators to seek alternative scheduling schemes that can improve system efficiency.

SUMMARY OF THE INVENTION

The problems and deficiencies of prior art algorithms are overcome by an innovative approach for handling fairness and performance in cellular systems, which gives network operators greater flexibility in allocating resources among users with different channel qualities. As mentioned previously, mobile stations that consume about the same amount of resources may end up sending different amounts of data. This unique characteristic of cellular networks turns out to have significant implications on packet scheduling. As elaborated in the Detailed Description of a Preferred Embodiment section, it propounds us to reconsider the fairness issues in cellular networks, for example, what is fair and how to provide fairness. Scheduling schemes relate to overall system performance. Specifically, when changing the way resources are allocated among users with different channel qualities, the resulting total system throughput can also be different.

To the contrary, in a wired network, the total amount of data delivered depends solely on how many resources are used and is independent of how they are allocated. The situation is further complicated by the bursty nature of the data traffic.

According to the present invention, a channel-efficiency based scheduling algorithm can give network operators the flexibility of adjusting how resources are allocated among users with different link qualities and achieving the type of fairness and performance balance that they prefer. In a simple embodiment, the algorithm comprises the iterative steps of measuring channel quality for each user, calculating channel efficiency for each user and scheduling packets based on the channel efficiency values. Channel quality may be determined using conventional techniques such as determining signal power or signal to interference ratio or according to determining channel usage or effective serving rate metrics. Channel efficiency is the actual amount of data delivered to a user divided by the maximum amount of data that can be delivered with the same channel resource. Channel resources may, for example, include time slots in TDMA systems and their allocation via different modulation schemes. Channel efficiency is determined by the quality of the channel. The system may select a higher bit rate, potentially more errored modulation scheme or a lower bit rate, more dependable packet data delivery scheme for transmission. Packet scheduling algorithms may comprise a variation on the weighted fair queuing algorithms known in the art, where an exponent is variably chosen depending on the channel efficiency considerations and numbers of users as will be discussed further herein.

BRIEF DESCRIPTION OF THE DRAWINGS

FIG. 8 show plots of channel usage of users when half the users are MCS-8 and half are MCS-6 users where

FIG. 9 describes the case when two thirds of all users are MCS-8 users and only one third are MCS-6 users where

FIG. 10 shows the case similar to FIG. 9 where one third of the users are MCS-8 users and two thirds of the users are MCS-6 where

FIG. 11 shows the performance of users when there are equal numbers of MCS-8, MCS-6 and MCS-4 users in the system where

DETAILED DESCRIPTION OF A PREFERRED EMBODIMENT

Figure 1A:
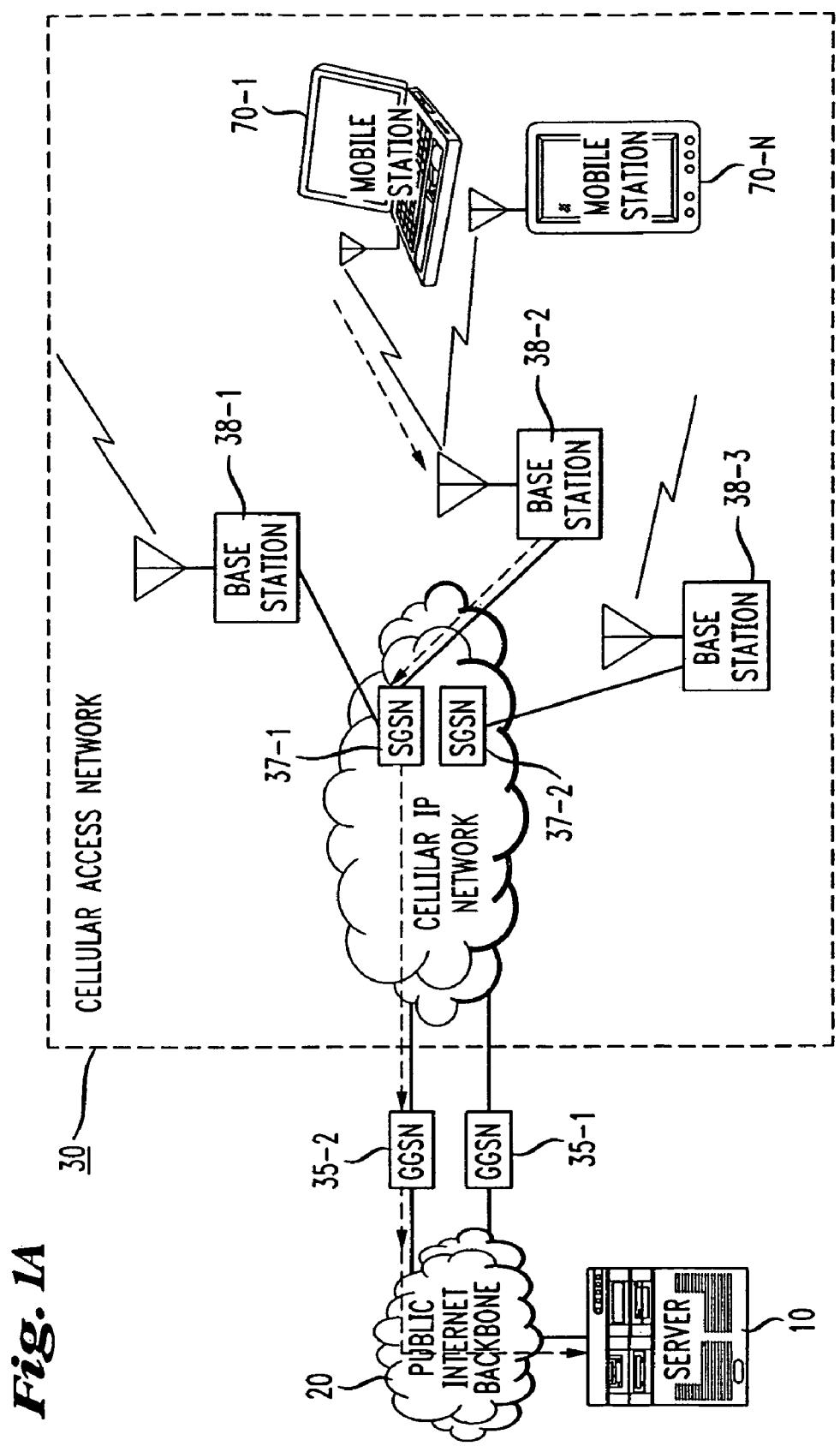
FIG. 1A is a system block diagram of a GPRS (General Packet Radio Service) third generational wireless system known in the art, with an Enhanced Data rates for a GSM Evolution (EDGE) air interface, which is used by way of example as a wireless cellular system in which the algorithm of the present invention may be used to advantage.

Referring to FIG. 1A, there is shown a system block diagram of a third generational GPRS (General Packet Radio Service) wireless system with an Enhanced Data rates for GSM Evolution (EDGE) air interface known in the art which is used by way of example as a wireless cellular system in which the algorithm of the present invention may be used to advantage. The present invention is simplistically shown in FIG. 13 comprising a channel efficiency based scheduling algorithm for scheduling packet delivery in such a system. The GPRS/EDGE system will be discussed by way of example only and the invention is not intended to be limited to such system but may be utilized in any wireless telecommunication system for scheduling packet delivery, including mobile and fixed users or a pico, micro or macro cellular system, within a building or outside.

Figure 1B:
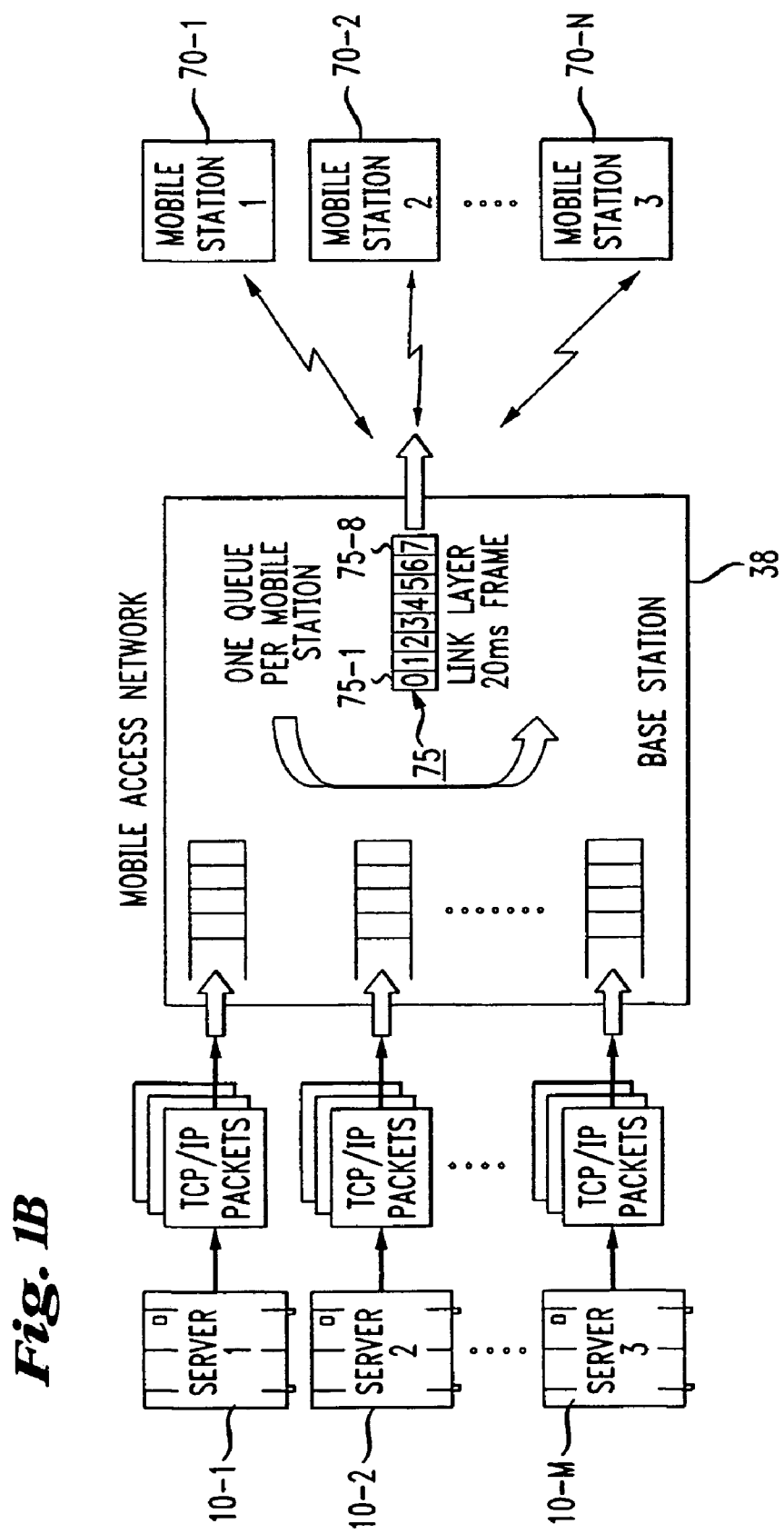
FIG. 1B is a concentrated block diagram showing a plurality of M servers providing TCP/IP data requested by a plurality of N users of mobile stations via a base station where queues are established as necessary for packet data delivery to the users at the base station, the base station being the congestion point in the network of FIG. 1A in downloading data to terminals.

In FIGS. 1A and 1B showing the GPRS cellular system with an EDGE air interface used by way of example, mobile stations (MS) 70, numbered from 1 ... N and denoted 70-1 to 70-N for a given base station 38-2, may be pocket computers or other mobile or stationary devices known in the art. These mobile stations 70 communicate with remote servers 10, numbered 1 ... M and denoted 10-1 ... 10-M in FIG. 1B through a cellular wireless access network, such as GPRS (General Packet Radio Services), which includes base stations (BS) 38, specialized routers, and gateways 35 to the Internet backbone 20 and server 10. Per FIG. 1A, users upload a request for files from mobile station MS 70, for example, mobile station 70-1 to base station 38-2. Base station 38-2 in turn forwards the request to Serving GPRS Service Node (SGSN) 371 which communicates with Gateway GPRS Service Node (GGSN) 35-2 at the edge of the network interface to public Internet backbone network 20. The request then finally reaches a server 10 (or plurality of servers 10-1 through 10-M per FIG. 1B) which then turns around and delivers the requested data files via the reverse or download path. After users typically deliver a request to file servers 10, files are delivered from the servers 10 to mobile users through the base-station BS (denoted 38-1 ... 38-3 in FIG. 1A) using the TCP/IP protocol.

For simplicity, we characterize the path from the servers 10 to the wireless access network (shown in the drawings as a mobile access network) only by the propagation delay incurred in the path. Within a cellular access network, the delay is comprised of the queuing delay at the base station 38 plus the over-the-air delay to the mobile station MS 70 (assuming one queue per station). The value of the backbone network one-way propagation delay is set to having an average, for example, of 60 msec. Of course, the total round trip propagation delay will vary from system or network type to system or network type (microcellular/macrocellular) and may vary from base station (BS) 38 to base station for the same type of system. The packet scheduling algorithms schedule downstream packets to mobile stations MS 70-1 ... 70-N within the coverage area of a single base-station, for example, (BS) 38-2. The majority of the traffic is typically from servers 10 outside the cellular access network 30 to the mobile stations 70, and, as emphasized by FIG. 1B, the sole congestion point of the combined networks is the downstream radio link from the base station BS 38. The amount of up-link traffic, such as requests for files and TCP acknowledgments, may be negligible and experience negligible queuing delay. The principles of scheduling uplink transmissions from a mobile station may use the present invention to advantage and its principles should not be deemed limited to use in only a downlink path.

Our link layer assumptions closely followed the specifications for EDGE. For example, building on the EDGE system, there is one time frame 75 every 20 msec, which is divided equally into 8 time-slots, 75-1 ... 75-8, as illustrated in FIG. 1B. Each user has its own queue at the base-station BS 38. The packet scheduling algorithm assigns time-slots to the non-empty queues. A user of a mobile station 70 is allowed to occupy one or multiple time-slots of the eight time slots 75-1 ... 75-8 available in one time frame 75. The amount of data delivered in one time slot is determined by a link adaptation process.

In cellular wireless networks such as network 30, channel quality depends on a number of factors including the location of the mobile station MS 70, the interference level from other mobile stations, and the transmission power. As a result, the optimum transmission scheme, which is determined by channel quality, can be different for different mobile stations 70 and at different times. In the EDGE example, several modulation and coding schemes are typically provided at the air link interface of the base station 38. These schemes and related apparatus may be referred to herein as resources among other resources for providing packet delivery. The link adaptation process adaptively chooses for each mobile station (MS) 70 the packet delivery scheme at the base station 38 for downlink or mobile station 70 for uplink that achieves the highest throughput under its current channel quality. Different schemes trade off differently between radio link bit rates and robustness, and therefore are optimal at different link quality regions. Less robust schemes, which have higher bit rates, are more suitable when link quality is good. Whereas when link quality is bad, more robust schemes are normally used. In the latter case, even though the radio interface rates associated with more robust schemes are lower, the overall data throughput is still better than using less robust schemes, which have much higher packet error rates under bad channel conditions. For instance, a scheme which delivers 40 kb/s with a 5% packet error rate would have a higher throughput than one with a 50 kb/s rate and a 30% packet error rate, even though the second scheme has a higher radio interface rate.

Link adaptation ensures that each individual mobile station receives overall throughput close to the optimal that is achievable with its current radio link quality. Table 1 shows the nine modulation and coding schemes defined in EDGE as well as the radio interface rate associated with each scheme. Other cellular radio systems may provide more or fewer, different or the same data delivery arrangements and, again, the present invention should not be deemed to be limited to EDGE. The EDGE schemes range from the fastest one that can deliver 59.2 kilobits per second per slot, to the slowest yet the most robust one that only delivers 8.8 kilobits per second per slot. Faster download schemes may be developed for download packet delivery, and the present invention should not be deemed to be limited by current download limits as it may be foreseeable, for example, that streaming video files such as motion picture movie files may be one day downloadable and viewable in real time.

The rates given in Table 1 are for the one time slot per frame 75 case. If a mobile station MS occupies multiple time slots in one time frame 75, it will have a higher rate. For instance, if a MS 70 that is eligible for scheme MCS-8 is assigned four time slots in one time frame, it can then send 1088*4=4354 bits in a 20 msec time frame and achieves a rate of 54.4*4=217.6 kb/s in that time period. Users are assigned different modulation and coding schemes to reflect the different channel conditions they might experience.

TABLE 1

MODULATION AND CODING SCHEMES IN EDGE

| Scheme | Modulation | Maximum rate per slot [kb/s] | Data Per Slot [bits] |
|---|---|---|---|
| MCS-9 | 8PSK | 59.2 | 1184 |
| MCS-8 | | 54.4 | 1088 |
| MCS-7 | | 44.8 | 896 |
| MCS-6 | | 29.6/27.2 | 592/544 |
| MCS-5 | | 22.4 | 448 |
| MCS-4 | GMSK | 17.6 | 352 |
| MCS-3 | | 14.8/13.6 | 296/272 |
| MCS-2 | | 11.2 | 224 |
| MCS-1 | | 8.8 | 176 |

Data applications such as e-mail and Web browsing are expected to account for most of the traffic in cellular data systems. Traffic generated in typical web browsing sessions can be characterized by, the ON/OFF model shown in FIG. 2. Although the model was derived from previous studies of Internet traffic, we expect that it may also be applied to most of the other interactive Internet applications, such as email.

Figure 2:
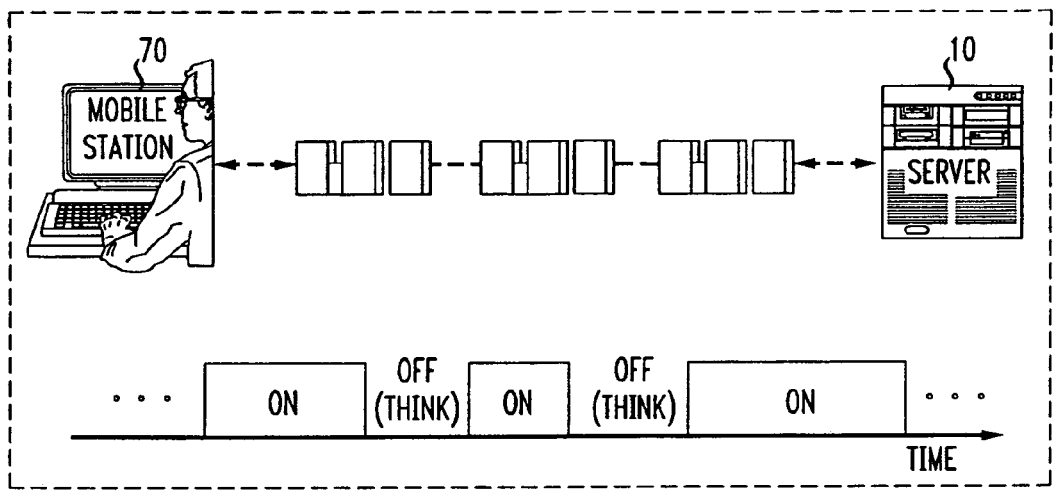
FIG. 2 is a representation of a typical download session showing periods of ON downloading of requested files representing web pages and off periods over time.

In a typical web access environment, upon a user request for a new page, one or more files are transmitted back to the user and the duration of the transfer corresponds to an ON period of the model (FIG. 2). Once the ON burst of files has finished, there is a period of "think" (OFF) time during which the user studies the information just downloaded, thus generating no traffic. A new ON period is started when the user requests a new page from his mobile station (MS). The workload model generates traffic by mimicking the web user access behavior described above, namely, requests a set of files, stops for a while, and then requests for another set of files, and so on. We take into account, due to the high cost and the low data rate in cellular networks, that mobile users will be more conservative in their channel usage, thus generating less traffic than regular wireline Internet users. We have chosen the average file size to be 8.2 kB and the median is 3 kB but download file sizes should not be deemed to be limited to such small sizes. For a 400 kb/s channel, when there is a single user in the system, the average data throughput of the user is presently 12 kb/s, which is about 3% of the total link capacity. And the resulting ON periods account for about 10% of the total time. With a slower channel or more users in the system, it takes longer to deliver files, thus the ON periods are extended, and the average data throughput of individual user decreases. Uplink transmissions may follow a similar model, for example, an "on" period for transmitting multimedia files followed by "off" periods.

As shown in FIG. 1A or FIG. 1B, TCP/IP is assumed to be the end-to-end transport protocol. Although more efficient protocols may be developed, the present invention should not be deemed to be limited to use of TCP/IP. Because of the slow start procedure in TCP, the link is typically not fully utilized at the beginning of a file transfer. Since the median file size is assumed to be only 3 kB, most of the file transfers are finished before the transmission rate reaches the full available capacity. Therefore, slow start and the value of the propagation delay are likely to have a big impact on the average end-to-end transmission rate. In order to focus on the service provided by the cellular network 30, we consider the actual rates at which data are served at the base station BS 38, which we refer to herein as the effective serving rate, rather than the end-to-end transmission rate.

The effective serving rate that a mobile station 70 receives from a base station 38 is defined in the following way. Consider there is a timer (not shown) for each mobile station's queue at the base station 38. Referring to FIG. 1B, each MS 70 may have its own queue at the base-station 38 for packet download. Whenever a packet arrives at an inactive queue, the queue becomes active and its timer is started. While the packet is waiting in the queue to be served, there might be additional packets arriving at the same queue; and even more packets may arrive while these packets are waiting, and so on. So the timer keeps running until the queue becomes inactive, i.e. when it is empty and stays empty for at least 20 msec. Recall that 20 msec is what it may take for the last piece of data from the queue to be delivered over the air in EDGE. If we divide the total amount of data-delivered when the queue is active by the length of the active period, we obtain a rate which indicates how fast the base-station serves this queue when it has data to send. We call this rate the effective serving rate that the corresponding user at mobile station 70 receives from the wireless channel. When measuring effective serving rate, the time a mobile station 70 spends waiting for the acknowledgments or for the packets to get to the wireless access network is not counted. While we suggest this effective serving rate as one performance or channel quality metric useable in the present invention, another performance metric may be applied to advantage as well within the scope of the present invention including conventional measures of channel quality such as signal power level and signal to noise and signal to interference ratios.

In EDGE, the system defines several modulation and coding schemes (Table 1) with different radio interface rates and robustness and uses a link adaptation process to optimize the throughput of a mobile station 70 by selecting the most efficient scheme based on its current channel conditions. To illustrate how the differences in channel qualities impact the packet scheduling results, we consider an EDGE system in which half of the mobile stations 70 are eligible for scheme MCS-8, which delivers 1088 bits in one time slot. The channel conditions of the other half of the mobile stations 70 are only good enough for scheme MCS-6, which means they can deliver only 544 bits in a single time slot. In this system, the MCS-8 users are the "good" and more efficient users, and the MCS-6 users are the "bad" and less efficient users. For simplicity, we assume link adaptation is able to eliminate packet errors in the system thus allowing us to focus on the different radio interface rates associated with different schemes. The classical weighted fair queuing (WFQ) algorithm is used to schedule packets with all the sources assumed to have equal weight. That is, when there are N non-empty queues at the base station 38, each of them receives 1/N of the radio resource.

Figure 3:
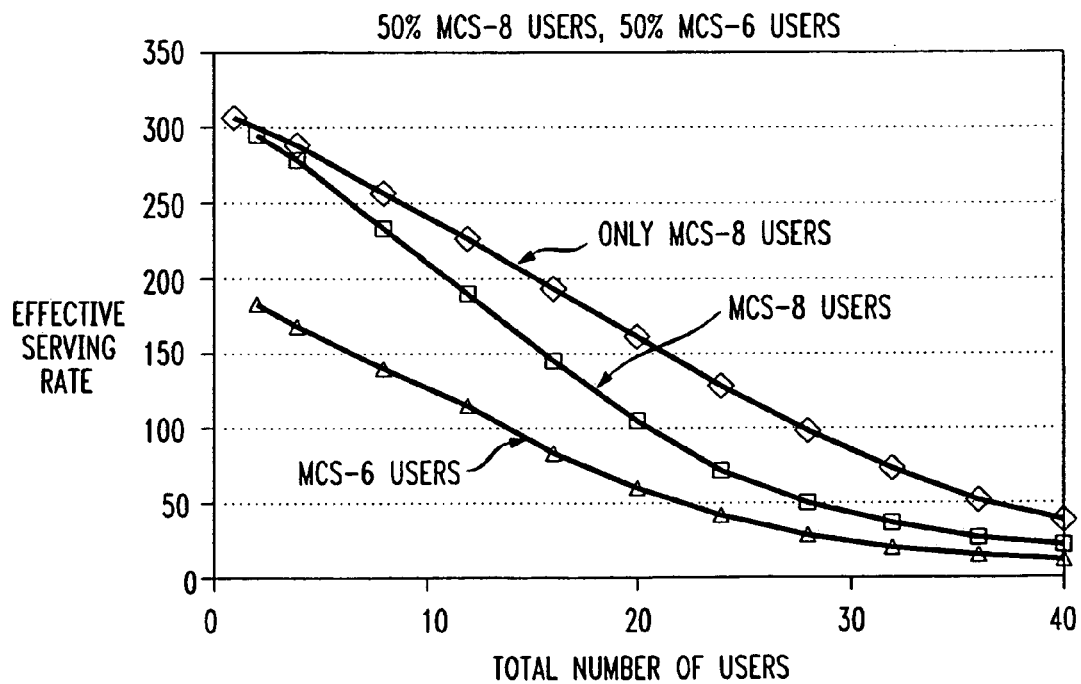
FIG. 3 shows a plot of average effective serving rate as a graph showing total number of users versus effective serving rate in kbps for different packet delivery schemes used by users in an EDGE system.

FIG. 3 compares the average effective serving rates of the MCS-8 and MCS-6 users in this system for a total number of users ranging from 2 to 40. Also plotted in the figure is the effective serving rate in a system where all the users have good channels and are eligible for scheme MCS-8. FIG. 3 clearly shows that the average effective serving rate of MCS-6 users is less than that of MCS-8 users in the same system, which in turn is less than the effective serving rate of MCS-8 users in a system where all the users are eligible for MCS-8. For example, when there are 10 MCS-8 and 10 MCS-6 users in the system, the average effective serving rates of the two types of users are 105 kb/s and 60 kb/s respectively, whereas when all 20 users are using MCS-8, the average effective serving rate is 160 kb/s. The important point here is that the poor channel quality of MCS-6 users not only make themselves suffer, but also penalize the MCS-8 users. This is because MCS-6 users have lower radio interface rate and take longer to serve. So, whenever a MCS-8 user has data to deliver, compared to a system where all the users are eligible for scheme MCS-8, it likely has to compete with more users. One thing we would like to point out is that the performance degradation of MCS-S users is in part due to the burstiness of the traffic. Had every user had a constant flow of data to send all the time, the WFQ scheduler would have assigned equal number of time slots for all the users, and the MCS-8 users would not have suffered from other users' poor channel quality.

Figure 4:
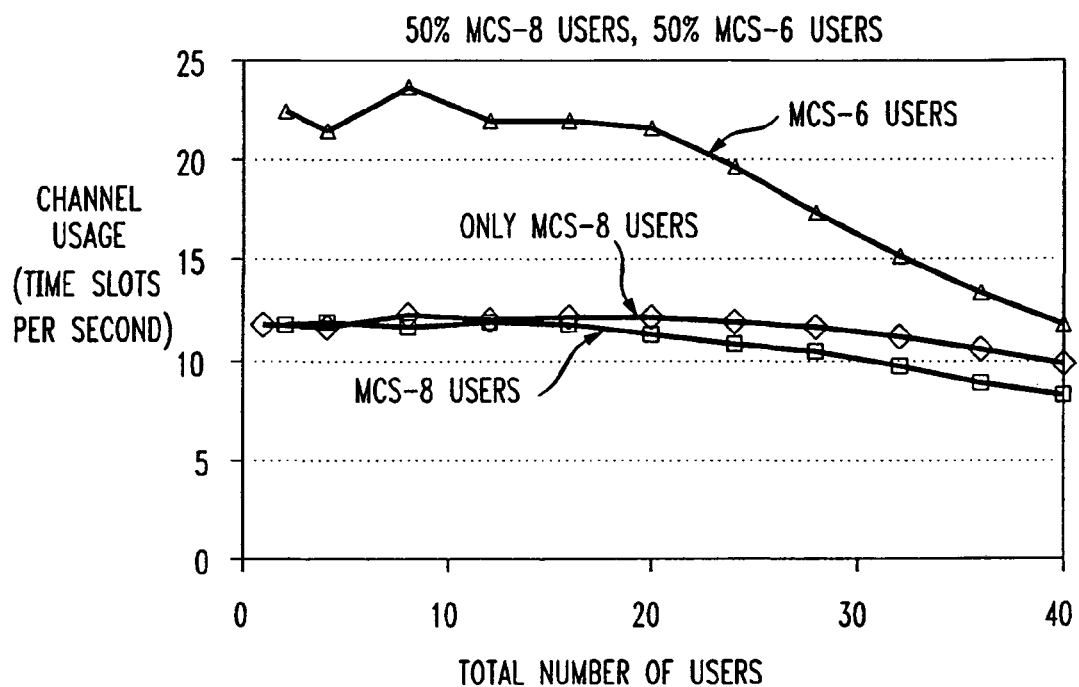
FIG. 4 shows a plot of average channel utilization as a graph of total number of users versus channel usage (time slots per second).

Given the difference in average effective serving rates of the two types of users, one might wonder just how much radio resources are used by these users. FIG. 4 compares the average per user channel usage in terms of number of time slots per second under the same set of conditions. It shows that, with a relatively small number of users in the system, the MCS-6 users, though having lower effective serving rates, are using about twice amount of resources (time slots). This is because they can only deliver about half the amount of bits in one time slot and there are sufficient amount of resources for all the users in those cases. As the number of users increases in the system, for example, towards 40, it can be seen that users have to compete with each other for the resources more often and the channel usage of MCS-6 users becomes closer to that of MCS-8 users.

Seeing the results shown in FIGS. 3 and 4, the immediate reaction one has is, the system seems to be unfair. However, some further thinking quickly leads to arguments that are completely opposite in terms of the kind of fairness they aim to achieve. On the one hand, one might argue that it is unfair for the good users to suffer from performance degradation because of the poor channel conditions of the bad users, not to mention that the bad users are also taking more resources than the good users (FIG. 4). On the other hand, bad users seem to be the ones treated unfairly because they are likely paying the same subscription fee for their services yet not getting the same rate. Both sides seem to deserve some preference but the system has to sacrifice one of them. Apparently, the origin of this problem lies in the different channel conditions experienced by cellular network users, which has also undoubtedly presented new challenges to offering fair and balanced services.

In addition to the fairness issue, from the standpoint of the system, assigning more time slots 75-1 . . . 75-8 of a frame 75 to good users will certainly improve the overall system throughput with the potential of bringing in more revenue. This is in contrast to a wireline network where, for a fixed amount of network resources, the total throughput remains the same no matter how they are allocated among users. In cellular networks, the highest throughput is achieved by first serving the ones that have the highest radio interface rate among all the mobile stations. On the other hand, the system also needs to make sure that bad users will not be too dissatisfied with their service, which means it may have to compromise the overall system throughput to some extent.

The system relies on scheduling algorithms to allocate resources among users with different radio link qualities. And scheduling no longer just changes individual user's performance, it also affects the total system throughput.

Figure 5:
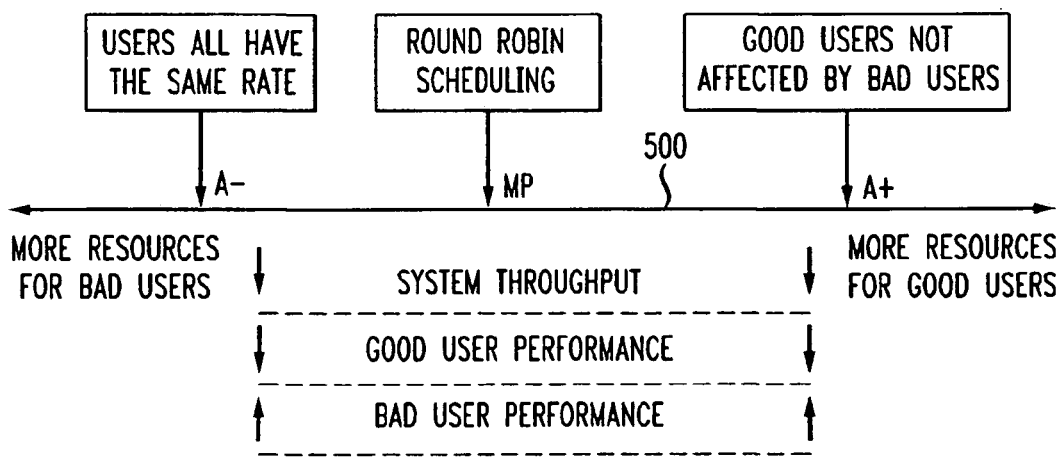
FIG. 5 shows an axis used in the present invention to differentiate among options for scheduling packets according to the present invention.

FIG. 5 shows a scheduling axis that illustrates the options of scheduling and its impact on the system. The middle point MP of the horizontal axis 500 corresponds to the conventional weighted fair queuing (WFQ) scheme used in the previous example where users are assigned equal weight. Moving to the right of the axis, the system assigns more and more time slots to good users and achieves a better overall system throughput at the same time. While moving to the left of the axis, things get reversed. With bad users receiving increasingly more time slots, both the performance of good users and the overall system performance degrade. Users have the same rate.

While the impact of the wireless channel characteristics on fairness and performance should have become clear from the discussions above, the question remains as to where the system should be operated along the axis 500 and how resources should be allocated among users with different channel qualities. It will be very difficult, if not impossible, to reach consensus on the fairness issue. In the mean time, the desired operating point of the system along axis 500 will depend on system loading, general satisfaction of the users, and charging method, etc., and will shift over time. Realizing that there is no single consistently optimum point for the scheduling algorithm to operate on, we believe an algorithm that gives network operators the flexibility of adjusting the operating point along the axis 500 shown in FIG. 5 should be used in cellular systems. An efficiency-based scheduling algorithm according to FIG. 13 can achieve this goal effectively.

Before providing the details of the algorithm, we would like to mention two particularly interesting points on the axis 500 shown in FIG. 5. One is the point marked with A+, where good users receive performance as if all the bad users also have good link qualities. In other words, good users are not affected by bad users' poor channel quality. For the system in the above example, when it is operated at A+, the middle curve in FIG. 3, which represents MCS-8 users, should move up to close to the top curve for all MCS-8 users. Intuitively, A+ could be a desirable operating point as it is at least fair to good users. An operator may choose to operate the system to the right of A+ on the scheduling axis 500 to achieve an even higher total throughput.

The other point, marked with A− in FIG. 5, is the one where all the users, regardless of their channel conditions, have exactly the same effective serving rates. At A−, bad users should be satisfied with their services as far as fairness is concerned. A− is also the point where previous work on wireless fair queuing may have intended to operate the system. Note that, there is practically no good reason to operate to the left of this point where bad users receive better service than good users.

Figure 13A:
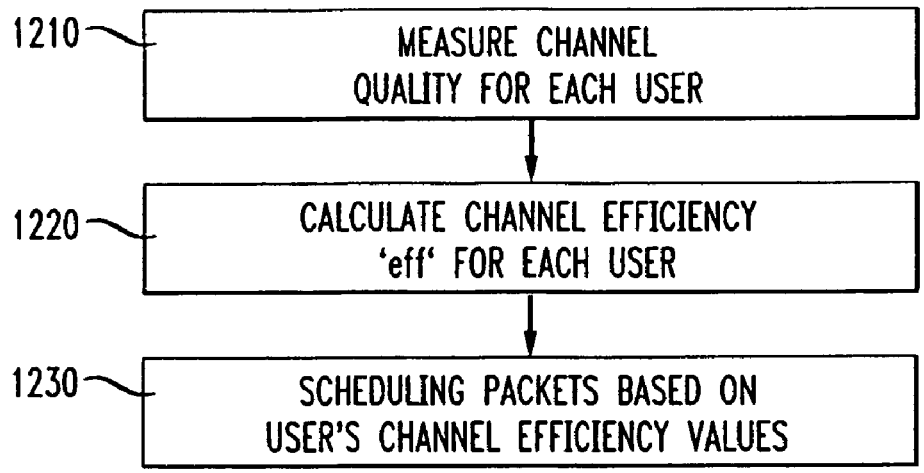
FIG. 13(a) is a flowchart of the algorithm for scheduling packets according to the present invention in a simple form and FIG. 13(b) represents the weighting and scheduling step 1230 of FIG. 13(a).

An efficiency-based packet scheduling algorithm according to FIG. 13 (a) can effectively adjust performance tradeoffs among users with different channel qualities. The first step 1210 of the algorithm is to measure the channel quality for each user, for example, by measuring the effective serving rate or channel usage metrics or via a conventional technique such as channel signal power or signal-to-noise or signal-to-interference ratio measurement, and then, in the next step 1220, calculate a value for channel efficiency. The algorithm of the present invention when utilized at a base station 38 keeps track of how efficiently a mobile station 70 is utilizing radio resources by periodically computing its channel efficiency, which may be defined as $$\text{efficiency} = \frac{\text{Actual Amount of data delivered}}{\text{Maximum Amount of Data That can be delivered with the same channel resource.}}$$

Figure 13B:
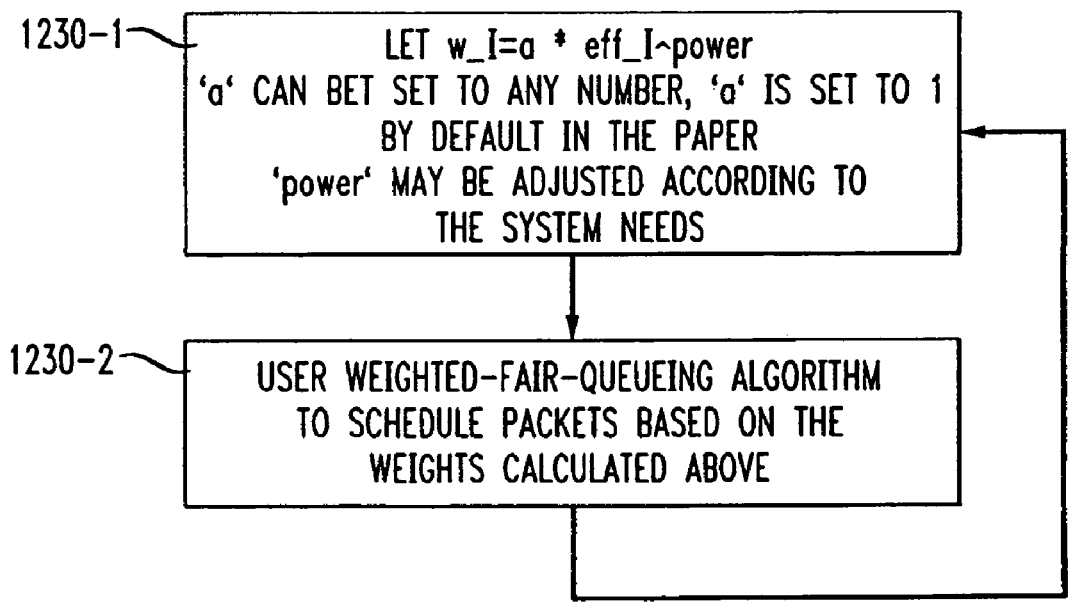

For EDGE, the maximum amount of data that may be delivered for a given amount of channel resource is calculated using the modulation and coding scheme with the highest radio interface rate defined in the system, which is 1184 bits per time slot as given in Table 1. Clearly, higher quality channels, which are eligible for higher rate schemes, will have higher efficiency values. Efficiency is always less than or equal to 1, but no less than 0 according to its definition. The general weighted fair queuing (WFQ) algorithm in the third step 1230 of the algorithm is used to schedule packets, and the weight assigned to a mobile station i is given by $$W = \text{efficiency}_i^{exponent} \text{ for each user } i$$

where the value of exponent (power) can be any real number. The weight that a mobile station 70 is assigned depends on the efficiency of its channel, and the value of the exponent. The weight may be intentionally influenced by a multiplier a as shown in FIG. 13(b), but a is set to 1 by default. By adjusting the value of exponent (power in FIG. 13(b), this efficiency-based algorithm can move its operating point along the axis 500 shown in FIG. 5 over time with changing packet download queuing scenarios and mobile station user channel quality. In particular, when the value of the exponent is greater than 0, the system assigns higher weights to good users hence improving their performance; whereas when the value of the exponent is less than 0, bad users will have higher weights and improved performance; when the exponent equals 0, all mobile stations 70 have an equal weight. In the last case, the algorithm is equivalent to the basic WFQ scheduler used by the example described above.

As per FIG. 13(b), step 1230-1 comprises calculating a weighting value where a may be any value but a is set to 1 by default. The value of exponent (Power) may be adjusted according to the system needs. In step 1230-2, a weighted fair queuing algorithm is used to schedule packets based on the weights for each station calculated in step 1230-1.

Clearly, at a value of exponent=−1, the weight of a mobile station 70 is proportional to the reverse of its efficiency. As a result, all the users should receive exactly the same rate, corresponding to point A− in FIG. 5. The value of exponent needed for the system to operate at A+ at the other end of axis 500 depends on the distribution of users in good and bad states as discussed below.

If the link quality of a base station 38 with its mobile station 70 is very poor, transmission for the base station 38 may be deferred similar to the approach taken by the previous studies mentioned above. Since we have designed a more flexible and dynamic scheduling scheme, we assume that link qualities are always good enough for transmission.

Results of the efficiency-based scheduling algorithm obtained under various channel conditions in an EDGE system are shown in FIGS. 6-11. Let us assume that there are equal numbers of two types of users and that half of the users in the system use scheme MCS-8 and the other half use MCS-6. The efficiency of the two types of users are 0.92 and 0.46 respectively according to the definition of efficiency and Table 1. The efficiency value calculated as step 1220 of the MCS-8 users is roughly twice that of the MCS-6 users. FIGS. 6(a) and 6(b) compare the average per-user effective serving rates of MCS-8 and MCS-6 users for values of exponent ranging from −2 to 2 for different total numbers of mobile stations 70 in the system. Similarly to FIG. 3, the average effective serving rate in a system where all the users are eligible for MCS-8 is also plotted in solid lines in the two graphs for comparison.

Figure 6A:
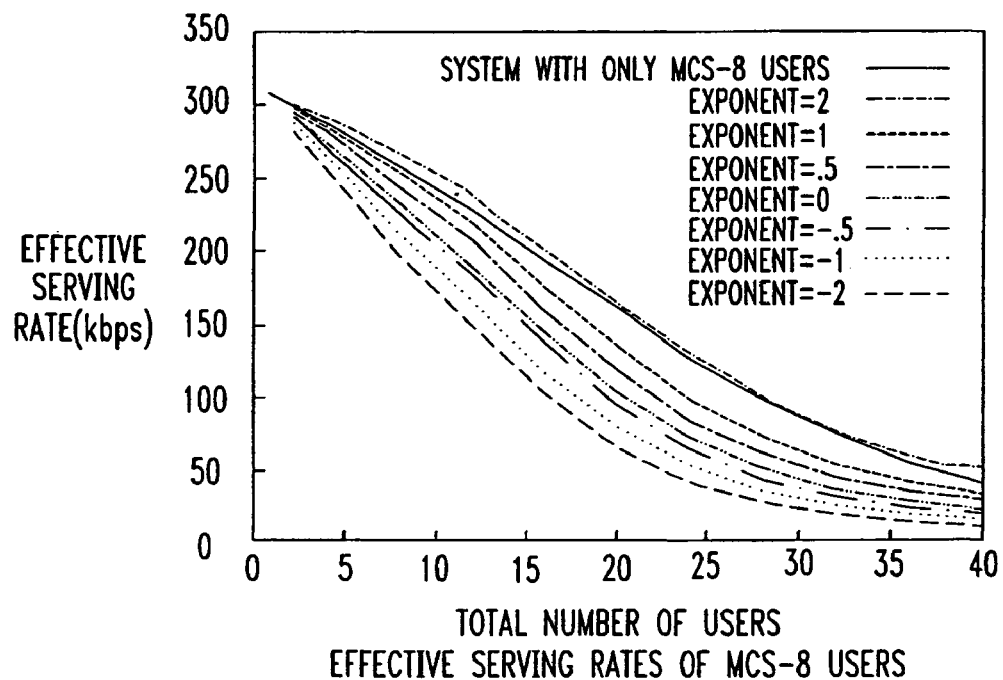
FIG. 6(a) is a plot of effective serving rates of MCS-6 users and FIG. 6(b) is a plot of effective serving rates of MCS-8 users.

The important point shown in FIG. 6(a) is that, by changing the value of exponent, the algorithm can effectively adjust how resources are allocated to good users. The curves corresponding to different exponents are well spread. The difference between the effective serving rates at exponent=2 and −2 is greatest at about twenty total users and is as much as 100 kb/s in most cases between ten and twenty-five users. Moreover, when exponent=2, the effective serving rate of MCS-8 users is improved to the level that as if all the users are eligible for scheme MCS-8. This corresponds to A+ on the axis in FIG. 5, where MCS-8 users' performance is not affected by the poor channel conditions of the MCS-6 users. As discussed previously, at exponent=−1, the algorithm should operate at A−. However, FIG. 7, which plots the effective serving rates of both MCS-8 and MCS-6 users at exponent=−1, shows that the two types of users do not have roughly equal rates until there are more than thirty users in the system, that is over 95% loaded. Essentially, this happens because traffic is bursty. At low utilization, when a mobile station 70 has data to send, it does not compete with all the other users in the system, but only the ones which also have data to send at that moment. In this case, the effective serving rate a user receives is limited by its radio interface rate rather than queuing delays, so good users can send data faster than the bad ones. This effect diminishes gradually when the system becomes more heavily loaded. We observed similar phenomena in another study on the performance of WFQ with bursty data traffic.

Figure 6B:
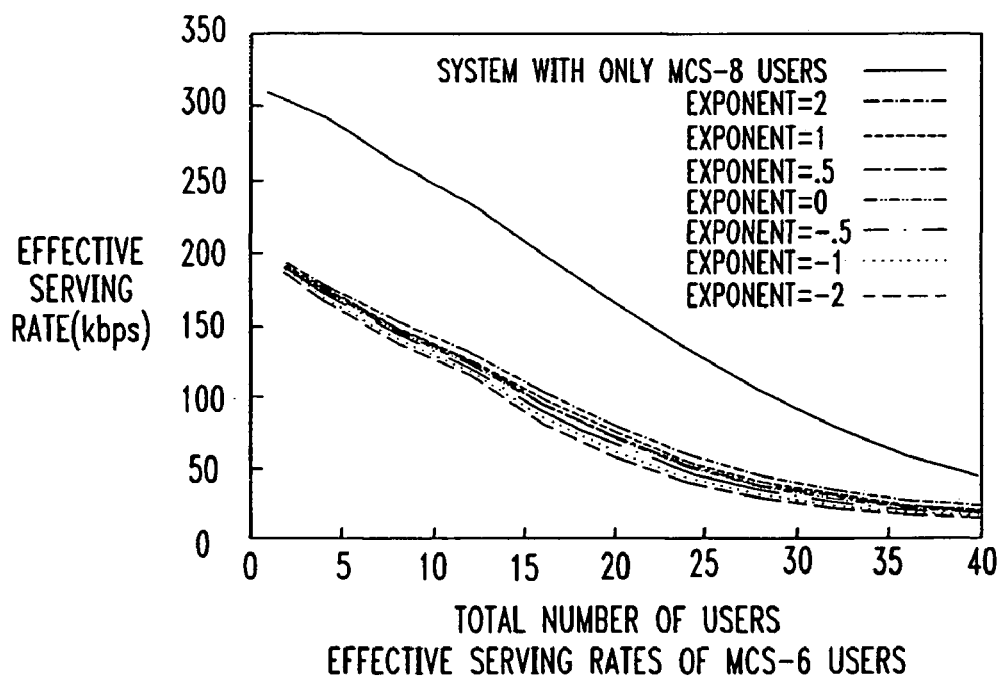
Figure 7:
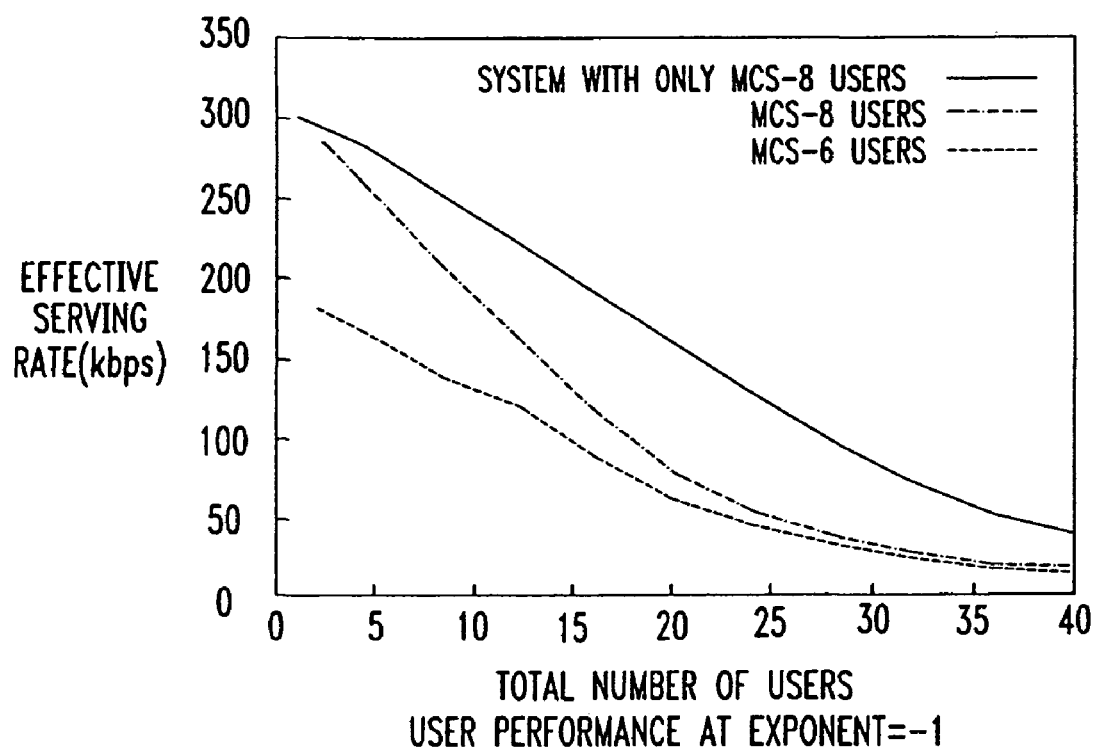
FIG. 7 shows a plot of user performance when an exponent of a packet scheduling algorithm is set to, a value of minus one.

Comparing FIGS. 6(a) and 6(b), it is clear that more positive values of exponents yield better performance for good users, while negative exponents improve performance for bad users. However, the performance improvement of MCS-6 users does not seem to match the performance degradation of MCS-8 users in most cases. For instance, when there are twenty total users in the system, as exponent drops from 2 to −2, the serving rate of MCS-8 users is reduced by almost 100 kb/s, yet the serving rate of MCS-6 users is up by merely about 25 kb/s. Even accounting for the fact that for every time slot taken away from the MCS-8 users, the MCS-6 users can only deliver half the amount of data as what MCS-8 users can deliver, the results seem to be lower than what it should be. Some careful investigations on the data reveal that this is again due to the burstiness of the traffic. Specifically, at exponent=2, MCS-8 users can send data much faster than MCS-6 users.

As a result, when a MCS-8 user does have data to send, there are likely more active MCS-6 users in the system. As the value of exponent decreases, the time slots that a MCS-8 user loses due to a lower weight are shared by not just one, but several MCS-6 users. So, an individual MCS-6 user's performance does not improve significantly. This result shows that, network operators should be very careful when trying to improve the performance of bad users by sacrificing good users, as the pay-off depends on the distribution of different quality users in the system.

Figure 8A:
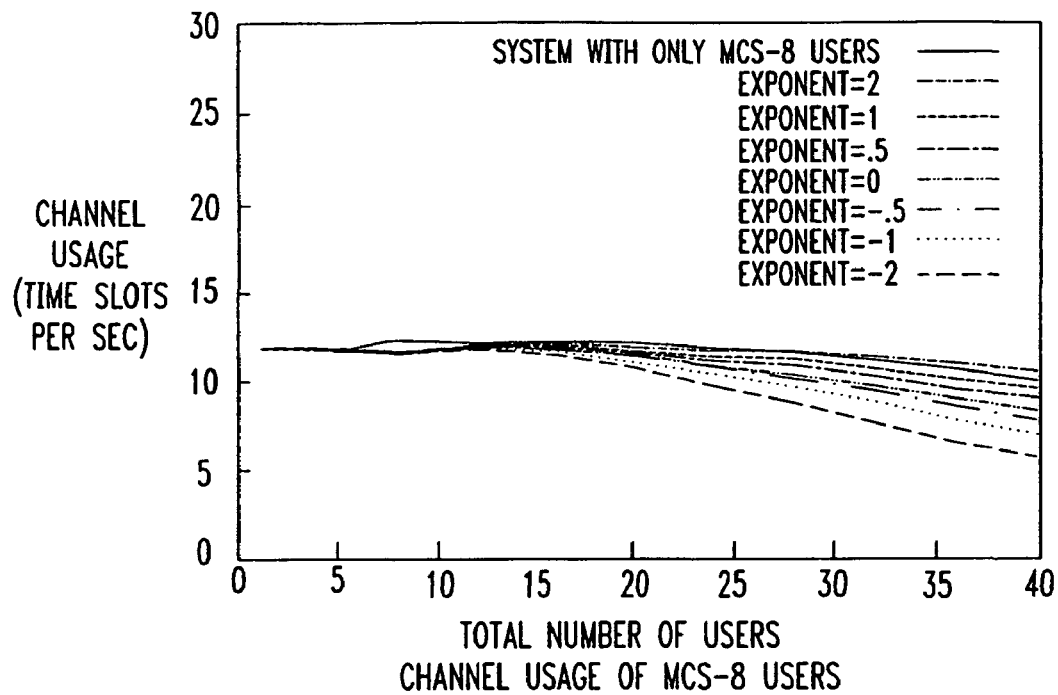
FIG. 8(a) shows the channel usage of MCS-6 users and FIG. 8(b) shows the channel usage by MCS-8 users.
Figure 8B:
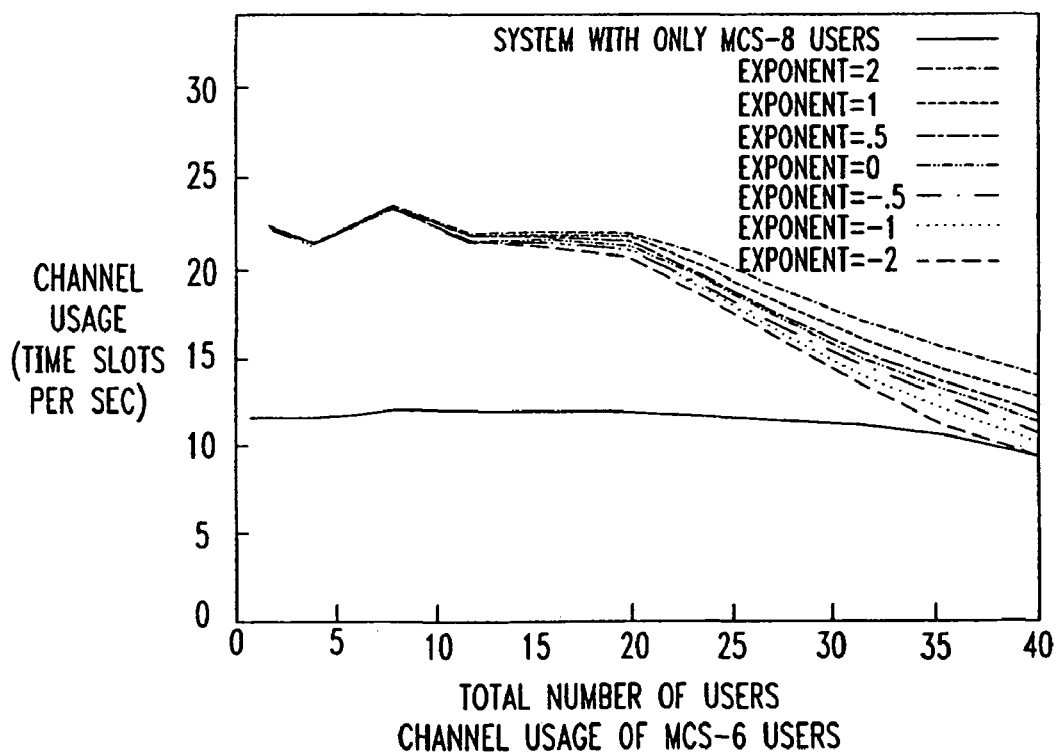

In addition to effective serving rate, another parameter (besides conventional measurements) that indicates fairness of a system is channel usage. FIGS. 8(a) and 8(b) provide plots of the channel usage of MCS-8 and MCS-6 users against the number of users for the same set of exponent values. Interestingly, when there are a relatively small number of users in the system, even though the effective serving rates shown in FIG. 6 change over a large range with different exponent values, the channel usage does not seem to vary that much. In other words, the average amount of bandwidth used by the users does not change much. This again may be explained by the bursty nature of the data traffic. Since an average ON period (FIG. 2) is only about 10% of an average OFF period, even if the rate is reduced by 50%, namely the ON period becomes twice as long, the average length of a cycle, which is an ON+OFF period, is only 10% longer. And the channel usage during the same period of time is reduced by less than 10%. In the context of web browsing, when effective serving rate goes down, users might feel that the channel is becoming much slower, but they may not be using much less bandwidth overall, because they spend the majority of their time reading the information downloaded. As the number of users continues to increase, the system becomes more congested, and this causes the channel usage to reduce more quickly.

So far, we have been studying systems with equal numbers of MCS-8 and MCS-6 users. A distribution of different types of users other than 50/50 has been studied and their scheduling results determined. In a first case, we assume ⅔ of users are eligible for MCS-8 and the rest are only eligible for MCS-6. In a second case, it is the other way around. Namely, ⅓ of users use MCS-8 and the rest use MCS-6. The results are plotted in FIGS. 9 and 10 respectively.

Figure 9A:
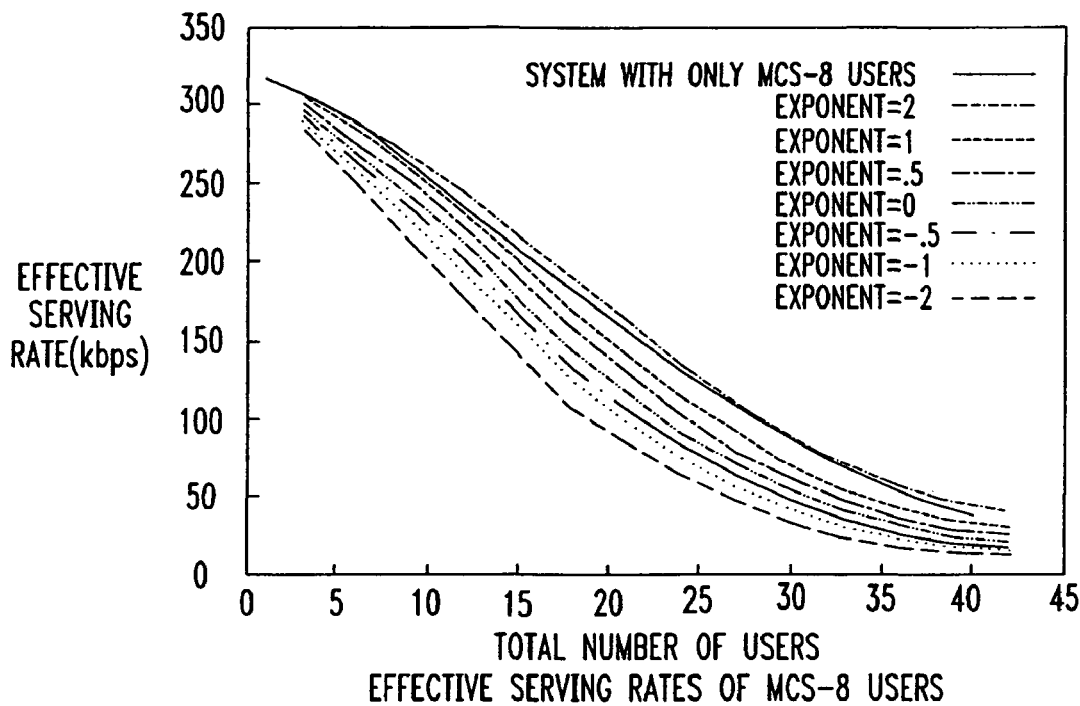
FIG. 9(a) shows the effective serving rates of MCS-8 users and FIG. 9(b) shows the effective serving rates of MCS-6 users.
Figure 9B:
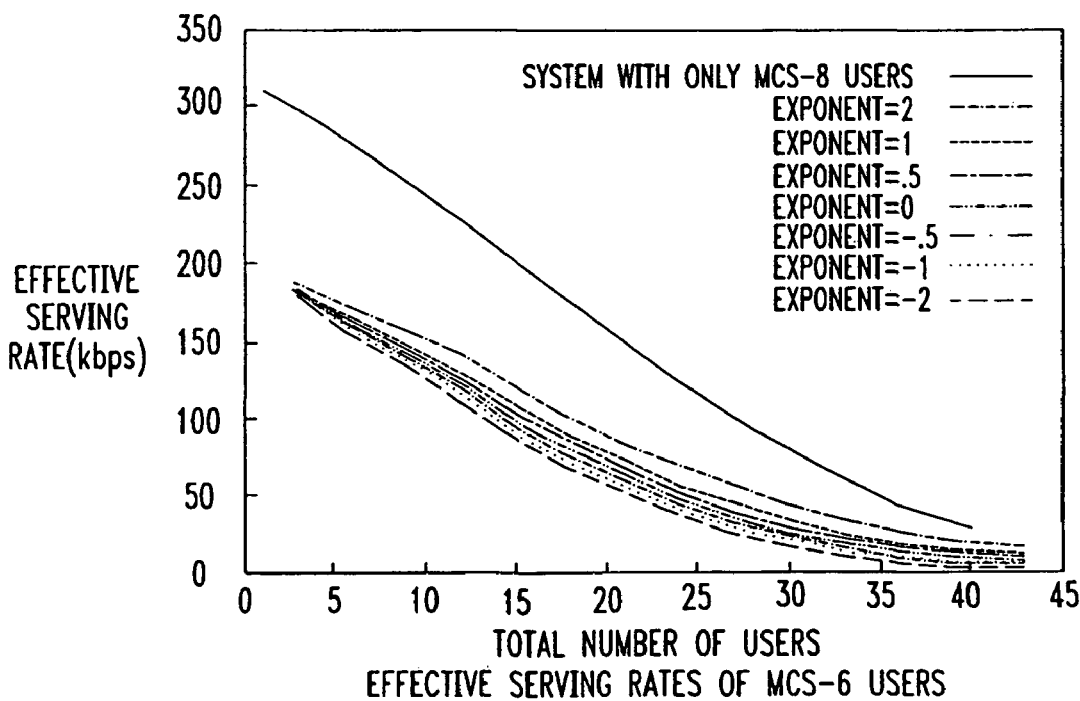
Figure 10A:
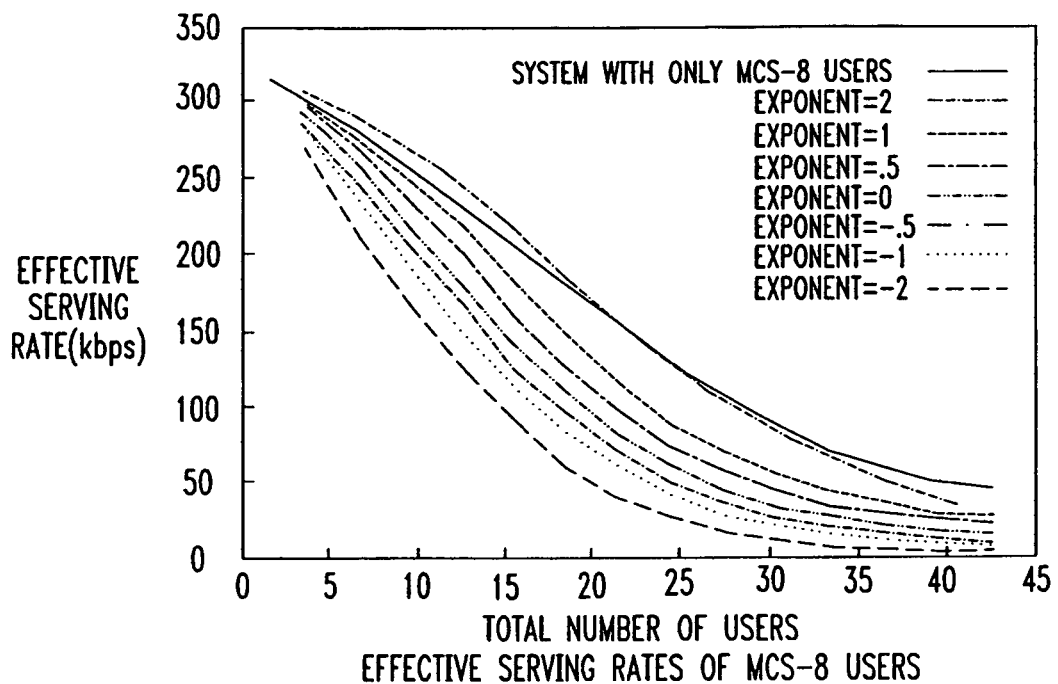
FIG. 10(a) shows the effective serving rates of MCS-8 users and FIG. 10(b) shows the effective serving rates of MCS-6 users.
Figure 10B:
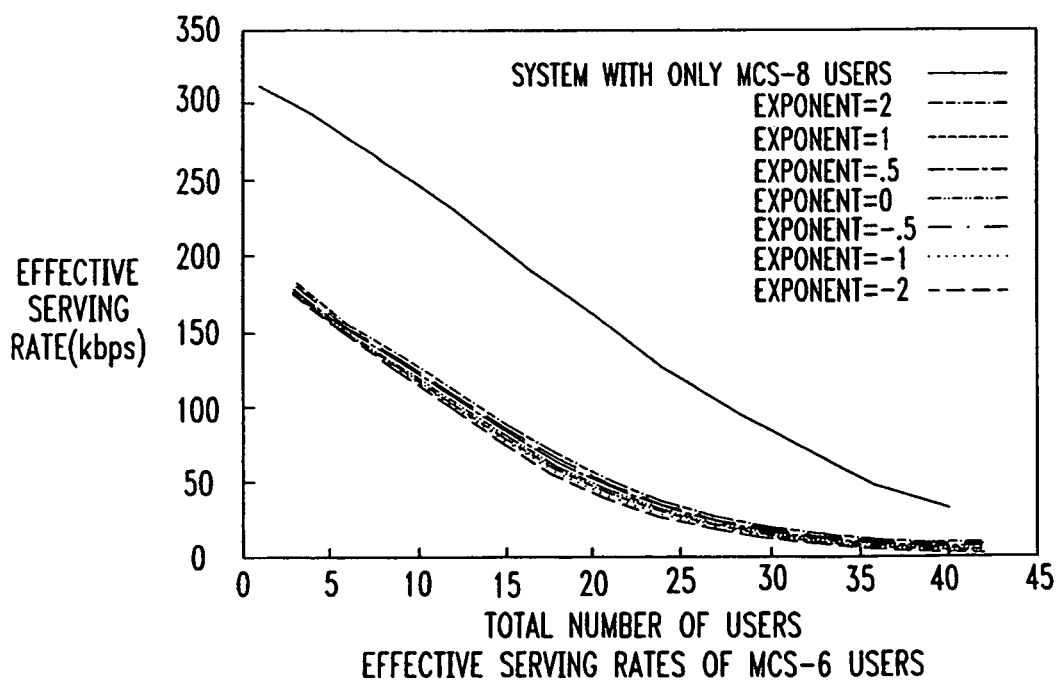

Both FIGS. 9 and 10 show that, by varying the value of exponent, the system can effectively adjust the way resources are allocated among users with different channel qualities. Moreover, in both cases, when exponent=2, again the performance of MCS-8 users is raised to the level that it is no longer affected by the poorer channel qualities of MCS-6 users, corresponding to A+ in FIG. 5. Comparing these graphs with the ones in FIG. 6, it is clear that as the percentage of good users decreases, the effective serving rates of good users become more sensitive to the value of exponent in weighting step 1230, while those of bad users become less sensitive, as each good user has to share the channel with on average increasingly more active bad users. These results reinforce the point that, when there is a relatively large proportion of bad users in the system, the system should not try to take away resources from good users. Otherwise, it might significantly degrade the performance of good users without literally making any improvements to the performance of bad users. Put in another way, if there is a relatively large number of bad users in the system, it is preferable to set the value of exponent to a positive value to improve good users' performance with little negative impact on bad users.

Figure 11A:
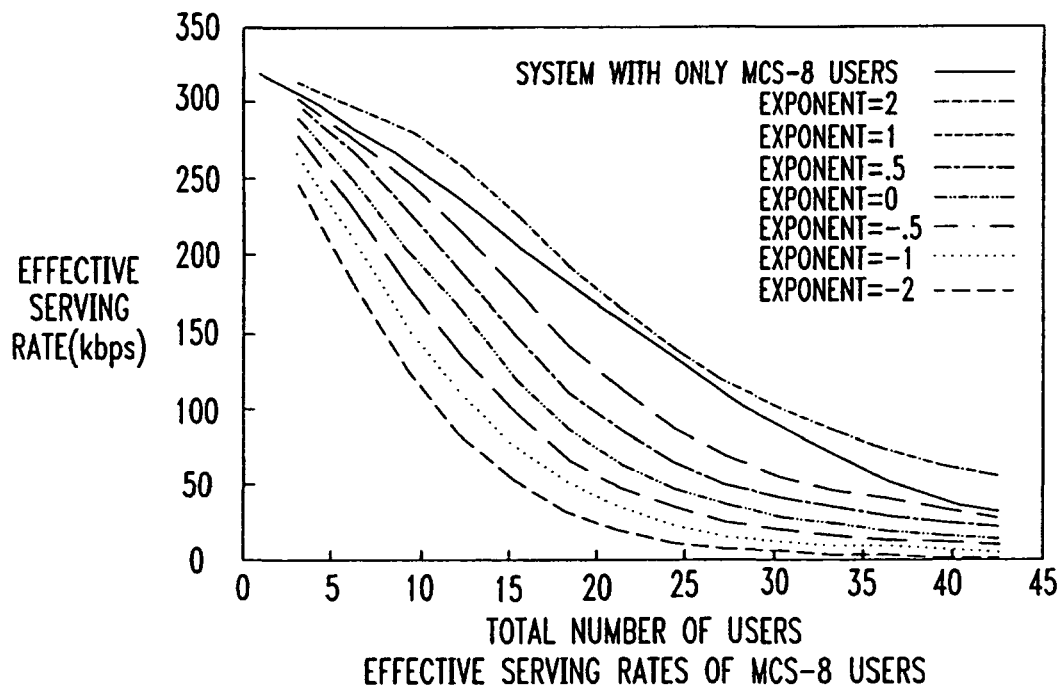
FIG. 11(a) shows the effective serving rates of MCS-8 users.
Figure 11B:
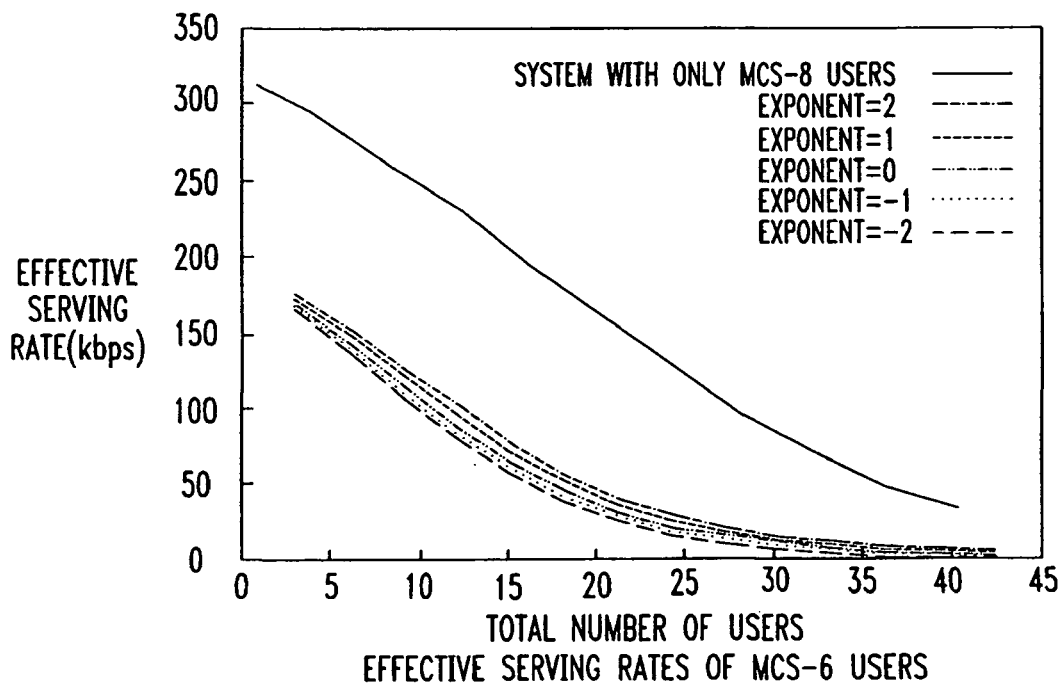
FIG. 11(b) shows the effective serving rates of MCS-6 users and FIG. 11(c) shows the effective serving rates of MCS-4 users.
Figure 11C:
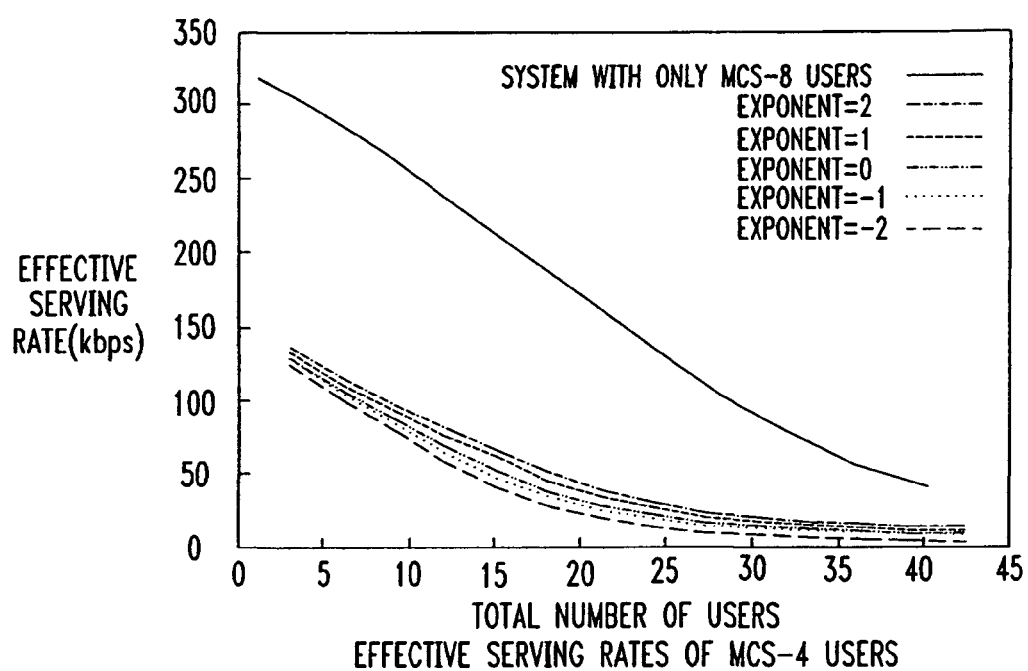

Referring to FIGS. 11(a), 11(b) and 11(c), having looked at the relatively simple systems with only two different types of users, we examine cases where more than two types of users co-exist in the system. FIG. 11(a) to 11(c) show the average effective serving rate of each type of user in a system that has three types of users, MCS-8, MCS-6, and MCS-4, and each type accounts for ⅓ of the total user population.

Even by introducing just one more type of users, we see some very interesting results. Consistent with what we observed previously, as the value of exponent increases, the performance of MCS-8 users, the best of the three, goes up; whereas the performance of MCS-4 users, the worst of the three, goes down. In addition, the improvement in MCS-8 users' performance is much more significant than the performance degradation of MCS-4 users. The interesting ones are the MCS-6 users, the ones in the middle. FIG. 11(b) shows that, as the value of exponent increases, the effective serving rate of MCS-6 users also goes up, just like the MCS-8 users, although in a much smaller scale. In general, as the value of exponent increases, except for the best and the worst types of users in a system, the effective serving rate of other users could improve or degrade depending on the distribution of different types of users in the system. For instance, as exponent goes up, a user is more likely to receive higher rates if most of the users in the system have lower efficiency and more likely to receive lower rates, if most of the users have higher efficiency. Regardless of the user distribution, the total system throughput will always improve with an increasing exponent.

Figure 12:
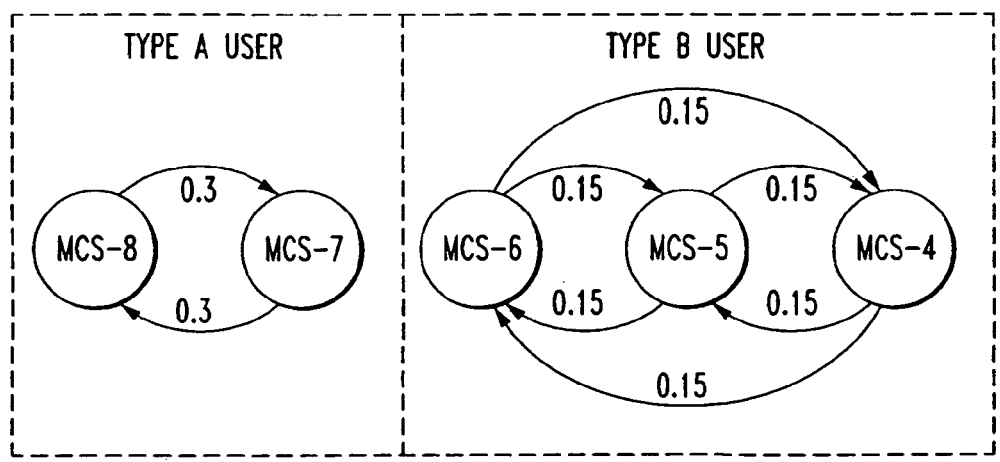
FIG. 12 is a channel state transition diagram showing two types of users having transition probabilities indicated and the probability of remaining in the same state is 0.7 for all states shown.

In cellular networks, not only different users may have different link qualities, channel conditions for the same user may also change over time. The results for a system which has two types of users, A and a, with transition probabilities is shown in FIG. 12 which is a channel state transition diagram. Note that the probability of remaining in the same state is 0.7 for all the states shown. We have also studied systems with packet errors. Following the design in EDGE, link level retransmissions were used to reduce packet error rates at TCP level. Results from these systems are similar to what we have shown for the error free cases. The algorithm was again shown to be effective in these new kinds of channel conditions.

As simple as the efficiency-based algorithm looks like, it wasn't without any glitches before we finally settled on this algorithm. In particular, several other algorithms we have tested didn't work out well. One category of algorithms we tested was credit-based algorithms. In these algorithms, users are rewarded with credits when they don't have data to send and users with more credits are assigned higher weights. Intuitively, because good users can use higher rate coding schemes and send their data faster, the algorithm should allow them to accumulate more credits, thus receiving higher weights and more time slots whenever they do have data to send. However, this type of algorithm didn't work well because of the bursty nature of the traffic. Specifically, in most cases, users are in the ON periods (FIG. 2) only a small fraction of time, e.g. 10% with our traffic model, so all the users have plenty of time to accumulate time slots regardless of their link qualities.

Algorithms which calculate the average channel usage over time try to take advantage of the fact that bad users consume more resources than the good users. However, these algorithms also failed due to the burstiness of the traffic. The change of channel usage turns out to depend much more heavily on the length of ON and OFF periods during a particular period, rather than the channel conditions.

Consequently, we have demonstrated that where users with different channel qualities may deliver different amounts of data using the same amount of radio resources, the fairness issues become complicated and also makes the overall system throughput depend on the scheduling scheme being used. To satisfy the more complex and dynamic resource assignment requirement in cellular environments, an algorithm according to the present invention can adjust -how resources such as time slots are allocated among users over time, hence achieving different trade-offs between performance and fairness. The present efficiency-based packet scheduling algorithm uses the classical weighted fair queuing with weights set to be proportional to channel's efficiency raised by an exponent value that can be intentionally varied. By adjusting the value of exponent, the algorithm effectively adjusts the resource assignments among mobile stations with different channel qualities.

A system using the present algorithm should be careful when trying to assign more time slots to bad users, as it may degrade the performance of good users in a disproportionate manner. At exponent=-1, all the users in the same service class have equal effective serving rates when the system is heavily loaded. At exponent=2, the scheduling algorithm is able to raise the good users' performance to a level that it is no longer affected by the poorer channel condition of bad users. We also observed that many of the non-intuitive results are due to the bursty nature of the traffic.

While an EDGE system was used by way of example, where users with different link qualities can have different radio link interface rates because of the use of link adaptation, the problem of link quality variation is generally inherent in wireless networks. The present invention may be utilized in any type of wireless network in which packets may be scheduled for delivery utilizing a varying amount of available resources such as time slots. For example, the present invention may be utilized in fixed or mobile wireless networks or in either the uplink from or downlink to a station. For example, in an uplink from a fixed station having the capabilities of allocating multiple time slots for its upstream use, the method of the present invention may additionally include the steps of the base station's communicating with the fixed station a selection of a number of time slots to be used for a given uplink transmission or portion of uplink transmission. The scope of the present invention should only be deemed to be limited in scope by the claims that follow.

The invention claimed is:

1. A method of scheduling packets for delivery to one of mobile stations and a corresponding base station in a wireless packet network comprising:
   calculating, via a base station, a channel efficiency for a mobile station, wherein said channel efficiency is determined by:

channel efficiency=(an actual amount of data delivered)/(a maximum amount of data that can be delivered with a same channel resource); and scheduling packets for delivery to said mobile station or said base station by determining a value of relative weight of said mobile station by a weighting equation, responsive to the calculated channel efficiency.

2. The method of claim 1, further comprising:
   measuring a channel quality for said mobile station.

3. The method of claim 2, wherein said measured channel quality is determined by calculating an effective serving rate.

4. The method of claim 2, wherein said measured channel quality is determined by calculating a channel usage.

5. The method of claim 2, wherein said measured channel quality is determined based on measurements of at least one of: a power of desired signal, a channel noise, or a channel interference.

6. The method of claim 1, wherein users with a higher channel efficiency receive a higher weight than users with a lower channel efficiency.

7. The method of claim 1, wherein said wireless packet network comprises an EDGE system.

8. The method of claim 1, wherein said scheduling comprises determining a choice of system modulation scheme among a high and low packet delivery rate.

9. The method of claim 1, wherein said method is responsive to a step of receiving a request for a download of data from said mobile station.

10. The method of claim 1, wherein packets are delivered via time frames, each time frame comprising a plurality of time slots, said plurality of time slots being allocated to said mobile station for packet delivery in accordance with a selection of a packet delivery scheme.

11. The method of claim 1 being applied to both downlink operations from said base station to said mobile station and uplink operations from said mobile station to said base station.

12. A base station apparatus for use in a wireless packet network comprising:
   a processor for calculating a channel efficiency for a mobile station and scheduling packets for delivery to said mobile station by periodically determining a value of relative weight of said mobile station by a weighting equation, responsive to the calculated channel efficiency, wherein said channel efficiency is determined by:

channel efficiency=(an actual amount of data delivered)/(a maximum amount of data that can be delivered with a same channel resource).

13. The base station apparatus of claim 12, wherein said mobile station is provided with a packet queue and associated with said packet queue is a timer for timing packet delivery.

14. The base station apparatus of claim 12, wherein said apparatus is for use in an EDGE system.

15. The base station apparatus of claim 12, wherein said base station apparatus is adapted to receive packets for delivery to said mobile station from a plurality of servers via the Internet.

16. The base station apparatus of claim 12, wherein a channel quality is determined by calculating an effective serving rate or by calculating a channel usage.

17. A system for transmitting wireless packets comprising:
a mobile station;
a server; and
a base station, wherein said base station comprises a processor for calculating a channel efficiency for said mobile station and scheduling packets for delivery to said mobile station via said server, by periodically determining a value of relative weight of said mobile station by a weighting equation, responsive to the calculated channel efficiency, wherein said channel efficiency is determined by:

channel efficiency=(an actual amount of data delivered)/(a maximum amount of data that can be delivered with a same channel resource).

* * * * *